F. A. HART.
COMBINED TYPEWRITING AND COMPUTING MACHINE.
APPLICATION FILED OCT. 16, 1916.
1,382,286.
Patented June 21, 1921.
8 SHEETS—SHEET 4.
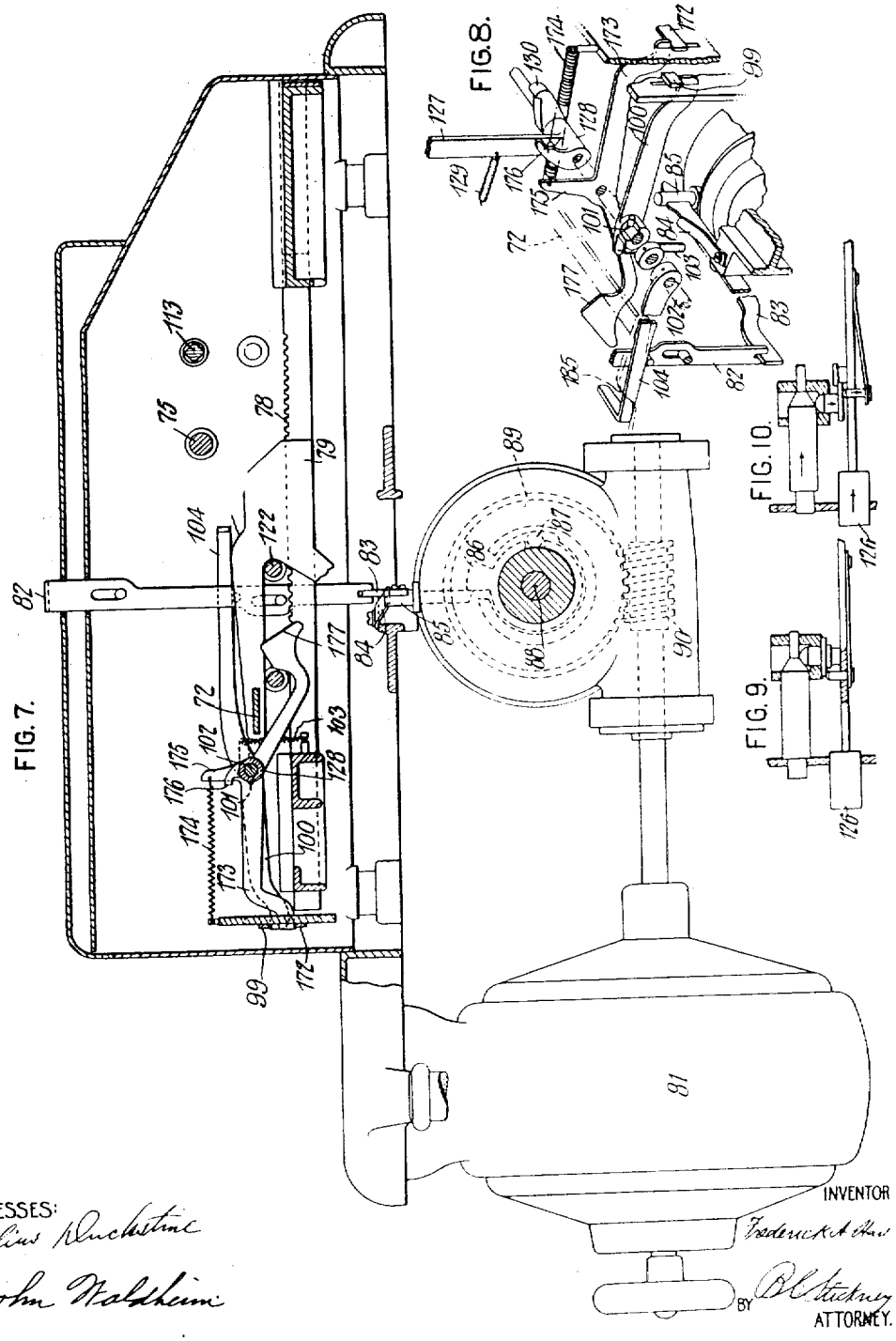

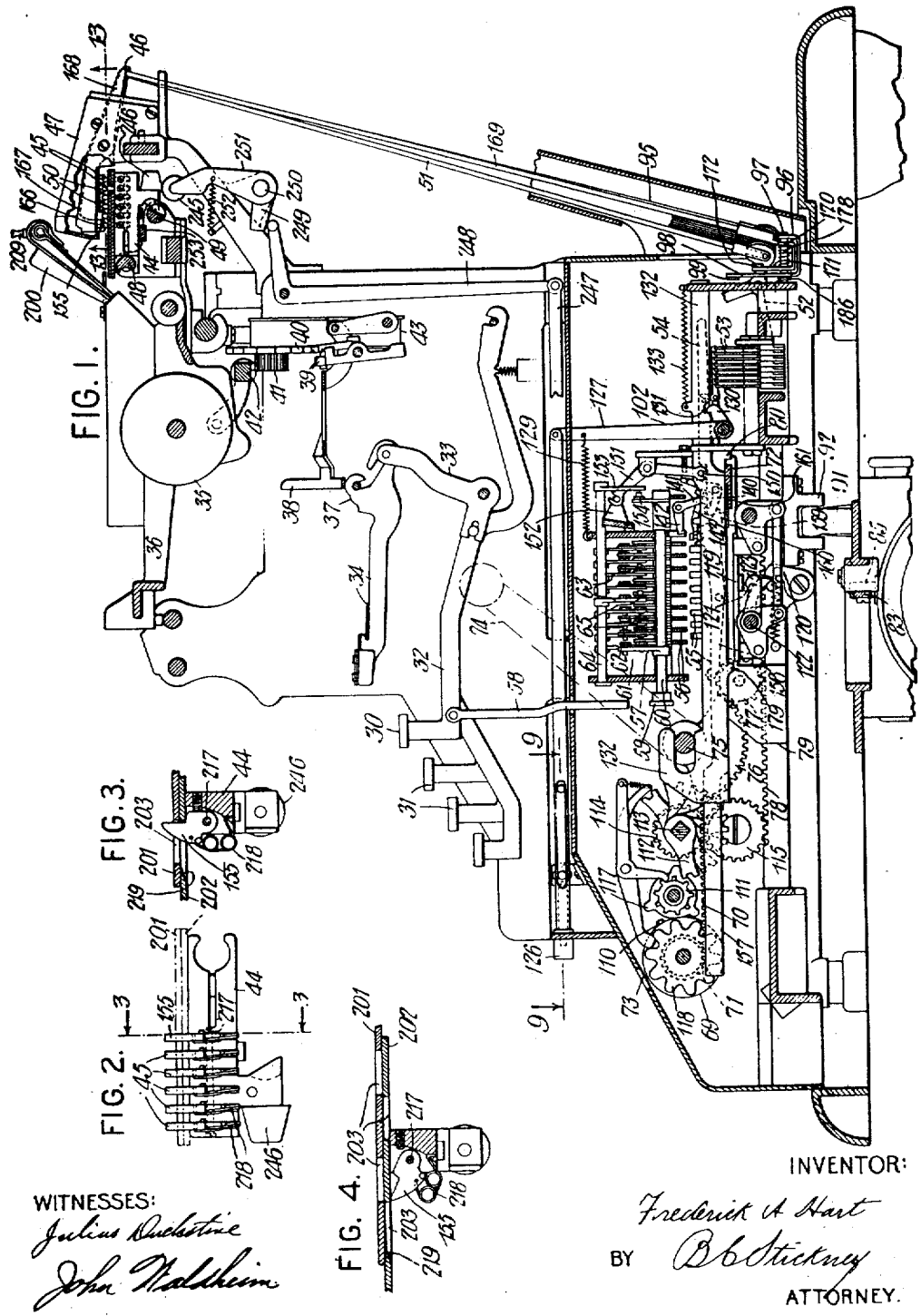

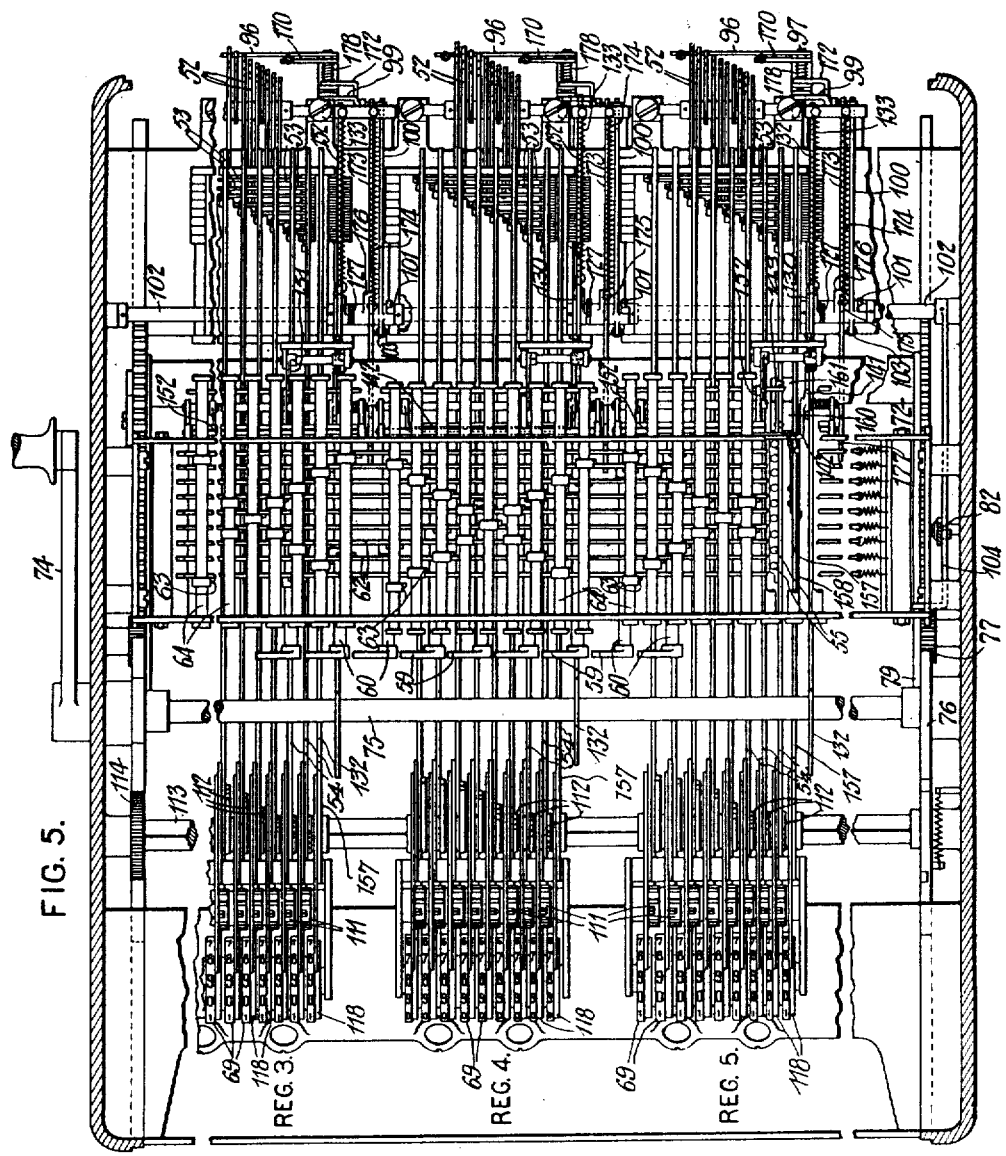

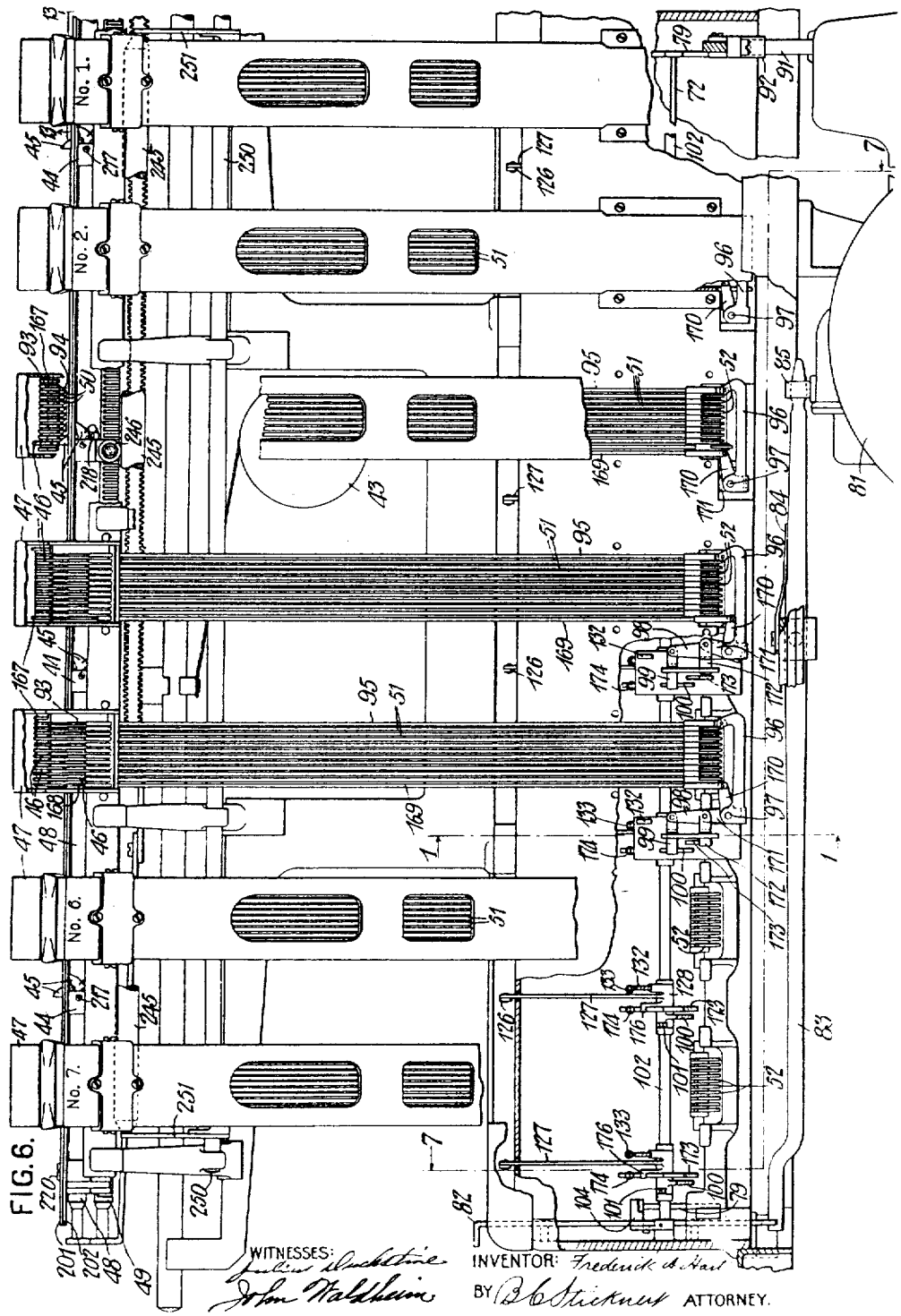

F. A. HART.
COMBINED TYPEWRITING AND COMPUTING MACHINE.
APPLICATION FILED OCT. 16, 1916.
1,382,286.
Patented June 21, 1921.
8 SHEETS—SHEET 5.
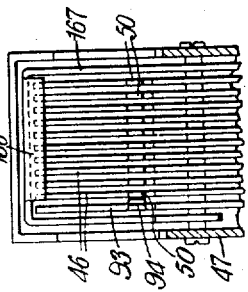
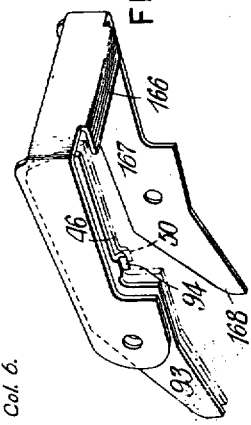
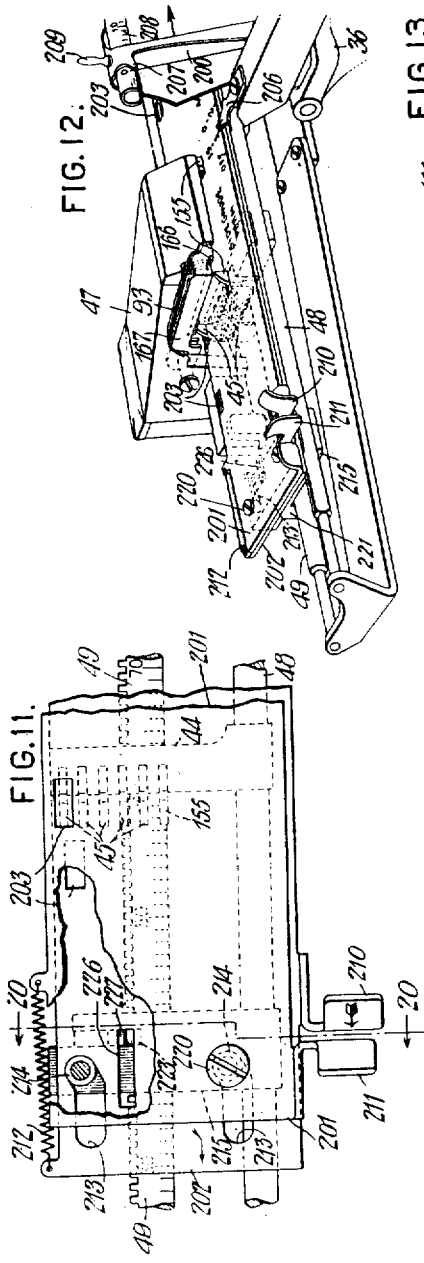
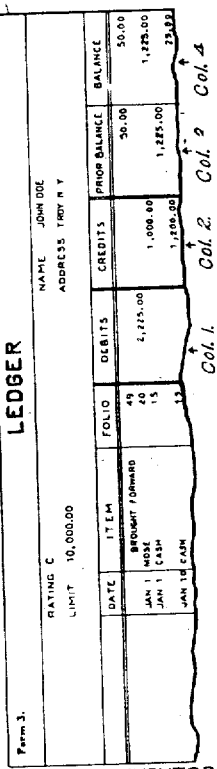
WITNESSES:
Julius Wickstine
John Waldheim
INVENTOR:
Frederick A. Hart
BY B. C. Stickney
ATTORNEY.

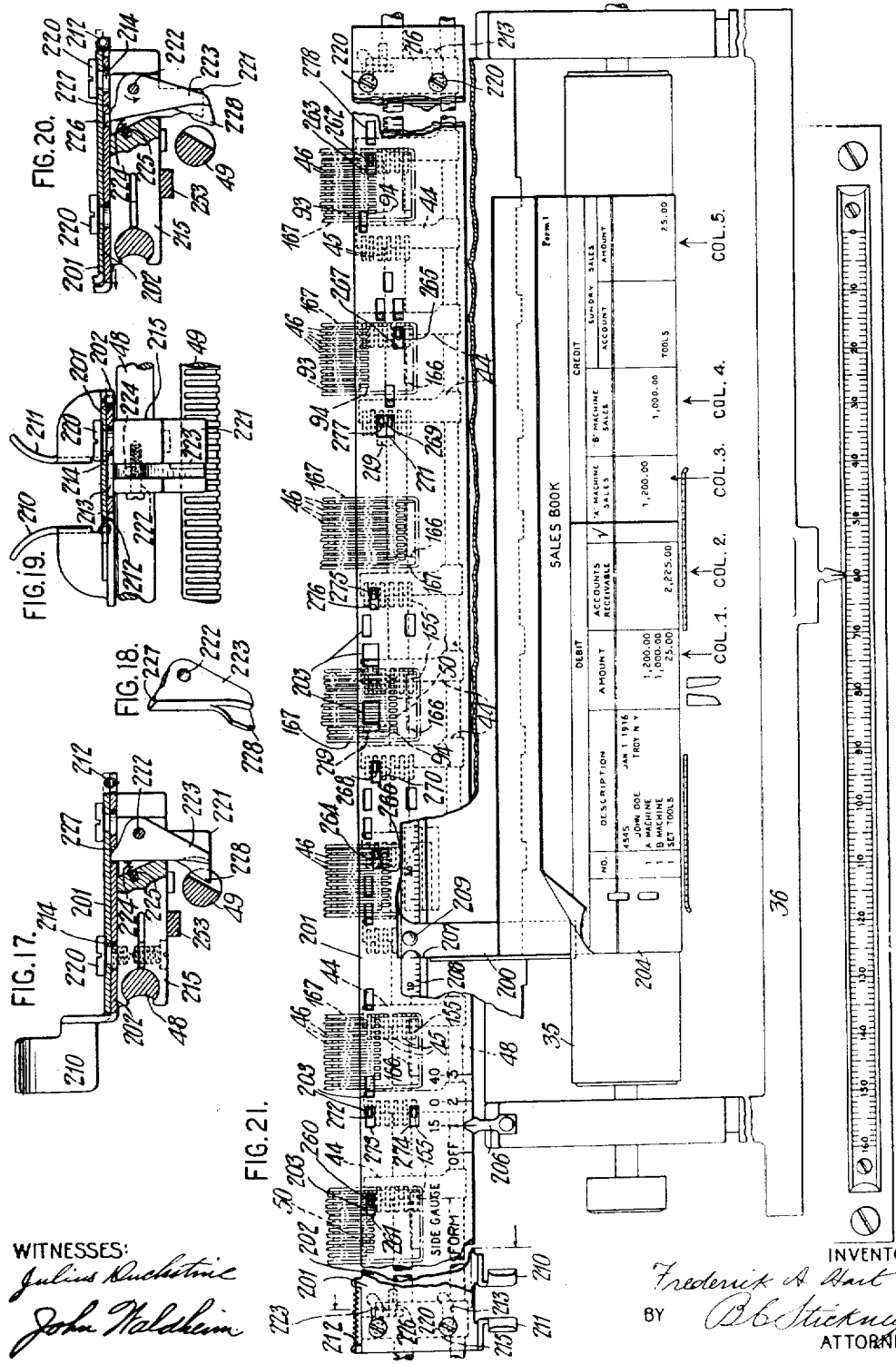

F. A. HART.
COMBINED TYPEWRITING AND COMPUTING MACHINE.
APPLICATION FILED OCT. 16, 1916.

1,382,286.

Patented June 21, 1921.
8 SHEETS—SHEET 7.

WITNESSES:

INVENTOR:
Frederick A. Hart
BY
ATTORNEY.

UNITED STATES PATENT OFFICE.

FREDERICK A. HART, OF NEWARK, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,382,286.   Specification of Letters Patent.   Patented June 21, 1921.

Application filed October 16, 1916. Serial No. 125,877.

*To all whom it may concern:*

Be it known that I, FREDERICK A. HART, a citizen of the United States, residing in Newark, in the county of Essex and State of New Jersey, have invented certain new and useful Improvements in Combined Typewriting and Computing Machines, of which the following is a specification.

My invention relates to computing machines, and is herein disclosed as applied to an Underwood-Hanson combined typewriting and computing machine in which the numeral keys of the typewriter set up numbers on computation members which are subsequently carried into dial wheels to exhibit the results of the computation, and is an improvement on my co-pending application, Serial No. 72,015, filed January 14, 1916.

My invention is designed to be used with computing machines in which there are a plurality of totalizers, there being seven totalizers herein disclosed and mechanism provided to control the state of said totalizers so that they may be caused to add, subtract or remain neutral during the operation of the machine, said state being controlled to conform to the required type of computation in conjunction with typewriting done on specific bookkeeping forms or work-sheets herein-disclosed. The machine, however, is not confined to any particular number of totalizer or to any number of bookkeeping forms and may be adapted to perform a great variety of work of the nature herein disclosed.

It has been found that in the hands of the ordinary operative or typist the separate setting of the connections to the different totalizers are troublesome, because they involve the setting of unfamiliar mechanical combinations, and therefore the setting of such parts is disconcerting to the average person into whose hands such a machine is likely to be placed for use. Moreover, in the hands of an expert operative skilled in the art of setting up machines of this character, said setting up will be troublesome and time-consuming in a machine in which there are a large number of totalizers and in which a variety of bookkeeping forms, for which the machine may have to be set up at frequent intervals, are used.

My invention simplifies the setting up of the machine to correspond to the various bookkeeping forms which may be used thereon, to such an extent that the ordinary typist may set the machine quickly and with certainty. For this purpose I have provided two slidably mounted superposed bars or plates at the rear of the typewriter carriage and moving therewith, said plates being adapted when moved relatively to each other and relatively to the typewriter carriage to control the denominational selecting mechanism so that the typewriter carriage in moving in letter-feed direction will automatically select the specific totalizer or totalizers in which computation is to be performed during the writing of numbers in a column on said bookkeeping forms, and said typewriter carriage will also automatically control the state of the totalizers in which computation is being performed.

I have found it advantageous to provide a finger-piece on each of said slidably-mounted superposed bars, placed in proximity to each other and held apart by a spring so that when said finger-pieces are pressed toward each other by the operative said bars will be unlocked from the typewriter carriage and moved relatively to each other, in which position said bars may be moved in unison relative to the typewriter carriage with the result that in one position said bars will make certain denomination selectors effective or ineffective and in another position said selectors may be effective in an entirely different manner, so that either the same denomination selectors or some of them may be made effective where they were ineffective before, and vice versa, or other selectors may be made effective or ineffective.

I have also found it advantageous to provide a gage for the purpose of positioning the various work-sheets or bookkeeping forms; said gage being slidably mounted on the typewriter carriage paper table, and settable to a scale corresponding to the scales provided on said slidably-mounted superposed bars, so that said work-sheets may be properly placed in the machine, and so that when numbers are written in predetermined zones marked on said work-sheets, that portion of the denominational selecting mechanism which is attached to the typewriter carriage will co-act with denominational members placed at the rear of the machine corresponding to the denomination of the digit written in said zone or column on the work-sheet.

Other features and advantages will hereinafter appear.

In the accompanying drawings,

Figure 1 is a sectional side view largely diagrammatic taken about on the line 1—1 of Fig. 6, of an Underwood-Hanson combined typewriter and computing machine showing my invention as applied thereto.

Fig. 2 is a detail view of that part of the denominational selecting device which is attached to the typewriter carriage showing the dogs in normal position.

Fig. 3 is a sectional view of the parts shown in Fig. 2, taken on the line 3—3 of Fig. 2.

Fig. 4 is a sectional view similar to Fig. 3, showing a denominational selecting dog in ineffective position.

Fig. 5 is a sectional plan view showing some of the totalizers and a portion of the indexing mechanism, denominational selecting mechanism, and transposition device.

Fig. 6 is a fragmentary diagrammatic view of a portion of the machine.

Fig. 7 is a diagrammatic sectional side view of the machine taken on the lines 7—7 of Fig. 6, showing the driving mechanism and some of the connections thereto.

Fig. 8 is a perspective view of some of the parts shown in Fig. 7 looking in the opposite direction.

Fig. 9 is a fragmentary sectional top plan detail view taken on the line 9—9 of Fig. 1, of the mechanism for holding the subtraction-setting bar in actuated position, the parts being shown in normal ineffective position.

Fig. 10 is a plan view similar to Fig. 9, showing the parts moved to effective position.

Fig. 11 is a fragmentary enlarged detail view of the left-hand end of the denominational controlling bars.

Fig. 12 is a fragmentary perspective view looking toward the rear of the parts shown in Fig. 11 and some of the adjacent parts of the machine.

Fig. 13 is a sectional view taken on the lines 13—13 of Figs. 1 and 6, showing one set of denominational selecting jacks, and adjacent parts, looking from the bottom upwardly.

Fig. 14 is a detail perspective view of the parts shown in Fig. 13.

Fig. 15 is a fractional view of a work-sheet which may be used in the machine.

Fig. 16 is a fractional view of another work-sheet which may be used in the machine.

Fig. 17 is a sectional detail view showing the mechanism whereby the denominational dog-controlling bars are locked to the typewriter carriage to move in unison therewith.

Fig. 18 is a detail perspective view of the locking latch shown in Figs. 17 and 20.

Fig. 19 is a rear view of the mechanism shown in Fig. 17.

Fig. 20 is a view similar to Fig. 17 and taken on the line 20—20 of Fig. 11, showing the denominational dog-controlling plates and the latch in actuated position.

Fig. 21 is a fractional plan view, largely diagrammatic, showing the typewriter carriage, the paper gage thereon, another form of work-sheet thereon and the denominational dog-controlling bars and paper gage in a position corresponding to the work to be performed on the work-sheet shown in this figure.

Fig. 22 is a view similar to Fig. 21, showing the parts set corresponding to the work-sheet shown in Fig. 15.

Fig. 23 is a view similar to Figs. 21 and 22, showing the parts set corresponding to the work-sheet shown in Fig. 16.

Figure 24:
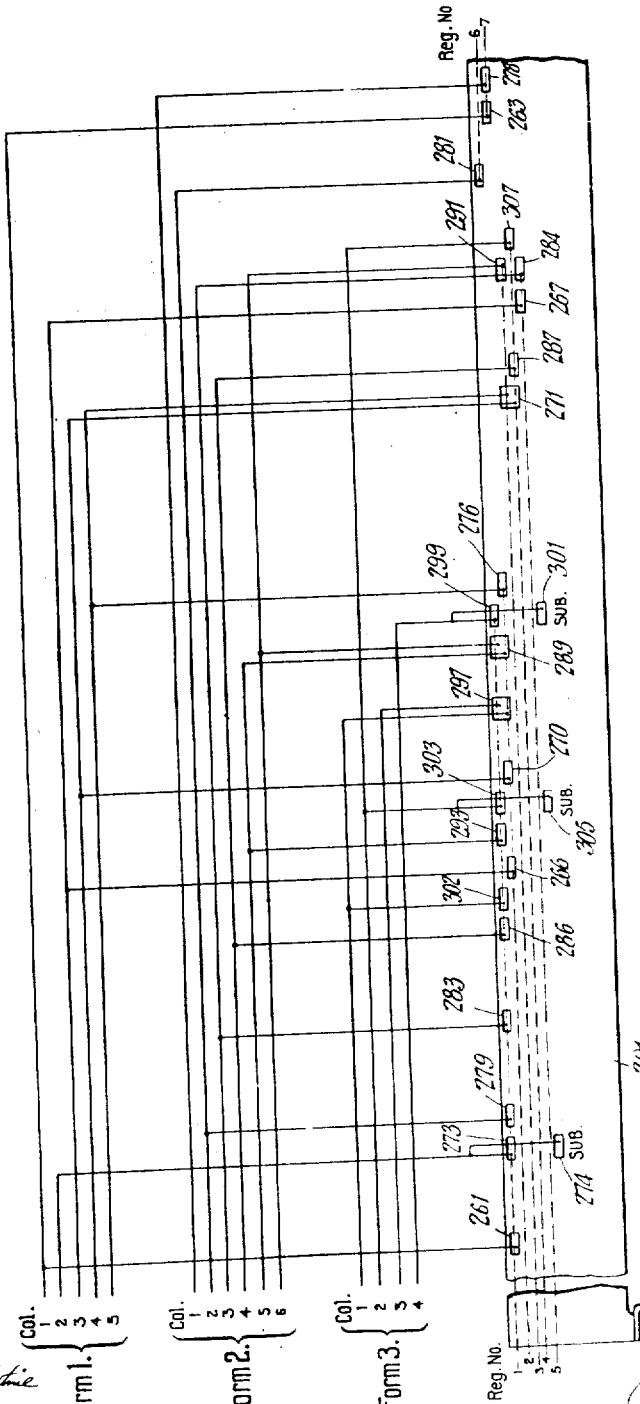
Fig. 24 is a diagram to show which of the perforations in the denominational dog-controlling bars permit the denominational selecting dogs to be moved to effective position to cause computation to take place in the various totalizers in a manner corresponding to the requirements of the various columns of the various work-sheet forms.

To print the characters upon the work-sheets, the usual Underwood-Hanson combined typewriting and computing machine is provided with numeral keys 30 and alphabet keys 31 on key levers 32 which when depressed swing bell cranks 33 to swing type bars 34 upwardly and rearwardly so that type thereon will strike against a work-sheet wound around a platen 35, said platen forming part of the usual typewriter carriage 36. Whenever any alphabet or numeral key is depressed a heel 37 on the actuated type-bar strikes a segmental universal bar 38, causing said universal bar to vibrate the usual typewriter carriage-feed dogs 39, said dogs permitting the carriage 36 to be drawn along a step at a time in letter-feed direction at each key stroke in the usual manner, said dogs 39 accomplishing this by their alternate engagement with an escapement wheel 40 which is connected to the usual pinion 41 meshing with the usual rack bar 42, connected to the typewriter carriage, which is drawn along in this manner, it being connected to the usual spring bartel 43.

In order that each digit of the numbers written upon the work-sheets may be indexed on a computing bar of the computing machine in its correct denominational position, the machine is provided with denominational selecting mechanism. For this purpose there are mounted on the typewriter carriage dogs 44 (Figs. 1, 2 and 3), on each of which is pivotally mounted one or more tappets 45 adapted to depress *seriatim* the rear ends of jacks 46 pivotally mounted in heads or casings 47 fast to the framework of the machine. The dogs 44 are adjustably mounted on a bar, 48 at the rear of the typewriter carriage, a rack 49 being provided to locate and hold said dogs in the desired position. The jacks 46 are provided on their forward ends with cams 50 (Figs. 1, 6 and 13), placed in the path of said tappets 45, so that the latter will actuate said jacks as the typewriter moves into a computing zone, beginning with the jack corresponding to highest denomination, and so on to the jack corresponding to units or lowest denomination. The rear ends of said jacks are adapted to depress vertically disposed links 51 mounted at the rear of the machine, the lower ends of which are connected to levers 52 which actuate transposition linkages 53 to move forwardly pin-bearing bars 54 (Figs. 1 and 5) in a manner illustrated and described in the pending application of Ogden Minton, Serial No. 797,714, filed October 28, 1913; (now Patent No. 1,280,065, of September 24, 1918) so that the pin bearing bar on the extreme left will be moved forwardly at the actuation of the jack 46 mounted on the extreme right. In other words, the jacks 46 and pin-bearing bar 54 of corresponding denomination are actuated simultaneously.

Each bar 54 is provided with nine index pins 55, one for each digit from 1 to 9, which, when said bar 54 is moved forwardly, are moved into juxtaposition with the lower reaches 56 of an indexing linkage mechanism 57 adapted to be actuated at the depression of any numeral key from 1 to 9 to depress one of the pins 55 corresponding to the value of the numeral key actuated.

For this purpose, each numeral key 30 is provided with a pendant 58, the lower end of which, when said numeral key is depressed, is moved into engagement with and actuates an arm 59 mounted on the forward end of a rock shaft 60. The rock shafts 60, there being one provided for each numeral key from 1 to 9, have fast thereon arms 61 (Figs. 1 to 5), the upper ends of which engage and actuate at each numeral key stroke linkages 62 connected to arms 63 fast on rock shafts 64, said arms 63 being connected at their lower ends to linkages 65 which when actuated cause a depression, by means of bell cranks (not shown herein), of the linkages 56 at the downstroke of the numeral key to depress the index pin 55 which had been moved into effective position by the tappet 45 and connected mechanism. Said pin-setting linkage mechanism is described and illustrated in the pending application of Richard M. Becker, Serial No. 782,307, filed July 31, 1913 (now Patent No. 1,296,354, of March 4, 1919).

It will be seen as each bar 54 corresponding to the denomination in which printing is done on the work-sheet is moved into effective position and as each numeral key is depressed, the number written on the worksheet will be indexed on the nest of pins 55 in such a manner that pins will be depressed on those rack bars corresponding to the denomination in which typewriting had been performed and the one pin on each rack bar will be depressed which corresponds to the digit printed in a corresponding denomination of the number. The digits from 1 to 9 only are indexed since no index pin 55 is depressed when the zero numeral key is actuated as in said application of Becker.

In order that the numbers thus indexed may be exhibited on the dial wheels of the adding heads, each rack bar 54 (Figs. 1 and 5) is provided with rack teeth 70 at its forward end and meshes with a pinion 71 connected to each dial wheel by means of the usual Underwood-Hanson one-way pawl-and-ratchet mechanism (not shown herein), so that when said rack bars are moved forwardly by means of a general operator cross bar 72, in a manner to be presently described, the dial wheels will be rotated in a clockwise direction, as seen in Fig. 1, amounts directly proportional to the value of the index pins depressed to exhibit the result of the addition at a sight opening 73 formed in the casing of the machine.

To move said general operator cross bar 72 forwardly so that its forward edge may engage the depressed index pins 55 and move therewith the rack bars 54, the machine may be provided with the usual handle 74 (Fig. 1) fast to a rock shaft 75, on which is mounted a pair of gear segments 76 meshing with idle pinions 77, which, in turn, mesh with rack bars 78 of a general operator framework 79, on which is mounted the common cross bar 72 extending across the machine directly beneath all of the pin-bearing rack bars 54. The parts are so arranged and proportioned that at the forward stroke of the reciprocation of the handle 74, the cross bar 72 will be moved forwardly and therewith all the rack bars upon which pins 55 have been depressed. At the return stroke of the handle 74, the cross bar 72 will be moved rearwardly and the rear end thereof will engage lugs 80, formed on the rack bars 54, to return to normal position all of said rack bars which have been moved forwardly in a computation.

In the machine herein illustrated, it is advantageous to reciprocate the general operator 79 by the power of an electric motor 81 (Figs. 6 and 7). Connection between the general operator and the driving mechanism of the motor may be effected either manually or automatically by the actuation of a key or by the movement of the typewriter carriage, respectively.

To actuate the general operator 79 at the will of the operative through the intermediary of the motor 81, there is provided on the machine a key 82 (Figs. 6, 7 and 8), which, when depressed, rocks a lever 83 against the tension of a leaf spring 84 to raise a latch 85, to release a clutch member 86 of a ball clutch 87, so as to connect the normally stationary shaft 88 with a constantly rotating member 89 driven through a worm gear 90 by the motor 81 in a manner illustrated and described in my co-pending application, Serial No. 569,451, filed December 9, 1910 (now Patent No. 1,211,148, of January 2, 1917). The shaft 88 is connected to a reciprocating member 91 (Fig. 1), which engages a yoke 92 fast on the general operator framework 79, so that when the latch 85 is raised, the reciprocating member or arm 91 can be moved forwardly and rearwardly, reciprocating therewith the general operator and all the rack bars 54 upon which pins have been depressed.

It is advantageous to trip the reciprocating mechanism of the general operator automatically by the travel of the typewriter carriage, at the completion of the indexing of the number to be computed as the typewriter carriage travels one letter-space beyond the position in which printing is done in units denomination.

For this purpose there is provided at the left of each units jack 46, a jack 93 (Figs. 6, 13 and 14) similar in construction to the jacks 46 and having a cam 94 formed thereon, spaced at less than one letter-space toward the left of the units jack, so that the tappet 45 will pass into and out of engagement with the cam 94 and so that the jack 93 may be returned to normal position at the end of said letter-space movement of the typewriter carriage 36 and the tappet 45 connected thereto.

As the typewriter carriage moves through said one letter-space distance after the printing and indexing of units, the tappet 45 in passing under the cam 94, will actuate the jack 93 so that the rear end thereof will depress the link 95 (Figs. 1 and 6), similar in construction to the links 51, to depress an arm 96 of a bell crank pivoted at 97 to swing an upright arm 98 thereof in a clockwise direction, as seen in Fig. 6, to move rightwardly a slide 99 (Figs. 1, 6 and 8), to release an arm 100 connected by a pin-and-slot connection 101 to a rock shaft 102, so that at the release of said arm 100, a spring 103, tensioned and attached thereto, will swing the arm 104 downwardly to depress the key 82 which, through the intermediary of its connections with the latch 85, will trip the ball clutch mechanism 87 to reciprocate the general operator in the same manner as when said key 82 had been depressed manually, as hereinbefore-described. The construction and action of the automatic motor-starting devices, herein-described, are similar in construction and action to the similar mechanism illustrated and described in the pending application of John N. Thornton, Serial No. 769,132, filed May 22, 1913 (now Patent No. 1,283,360, of October 29, 1918).

In the invention herein-disclosed, each set of jacks 46 is provided with a motor trip jack 93 placed relatively to the jacks 46, as herein described. It will be seen from the foregoing, that after every number written in the computing zone is indexed upon the computing mechanism, the general operator 79 will be automatically reciprocated to run said number into the dial wheels 69, either in addition or subtraction, according to the type of computation determined by the state-controlling mechanism, mounted on the rear of the typewriter carriage, to be hereinafter described.

As hereinbefore-described, each dial wheel 69 is rotated a digit's distance directly proportional to the value of the digit indexed on its associate index bar 54 at the forward stroke of the general operator 79. When any of the dial wheels are rotated an amount so that the numeral "9" thereon, passes the sight opening 73 in the performance of addition, it is desirable to rotate the dial wheel of next higher denomination one digit's distance in addition to the rotation imparted thereto by the rack bar 54. For this purpose, each dial wheel is provided with a carry-over tooth 110, so placed thereon, as to impart a partial rotation to a carry-over pinion 111, as the dial wheel moves from "9" to "0," so as to move the teeth of said carry-over pinion 111 into meshing relation with the associated one of a series of spiral sectors 112. Said sectors 112 are mounted on a shaft 113 (Fig. 1), at the end of which is a pinion 114, connected thereto by a one-way ball clutch (not shown herein); said pinion 114 meshing with an idle pinion 115, which is constantly in mesh with the rack 78 of the general operator 79. The ball clutch of the pinion 114 is so arranged that said pinion will rotate idly relative to the shaft 113, during the forward stroke of the general operator, but will rotate said shaft 113 therewith during the return stroke of the general operator, and will rotate therewith the sectors 112 to complete the rotation of those of the carry-over pinions 111, the rotation of which had previously been initiated by a carry-over tooth 110 of the associated dial wheel. Each pinion 111 has fast thereto a three-point pinion 117 adapted to engage and rotate a pinion 118 fast to the dial wheel of next higher denomination to rotate the latter one digit's distance at the completion of the carry-over action of the carry-over pinion 111. It will be noted that the carry-over mechanism, herein-described, is substantially the same as that illustrated and described in the patent granted to Hans Hanson, No. 816,319, dated March 27, 1906.

After the numbers indexed upon the pins 55 have been run into the totalizers and before a subsequent computation may be performed, it is desirable to restore all the depressed index pins to their normal position. For this purpose, there is provided a pin-restoring plate 119 (Fig. 1), for each set of rack bars 54, which is normally out of the path of the depressed index pins 55 and general operator cross-bar 72 and which is moved upwardly against the under side of all the rack bars 54 when the latter reach their normal return position. To actuate said pin-restoring plate, there is provided on the general operator frame 79, a pawl 120 which, at the forward stroke of the general operator, passes idly an arm 121 fixed to a rock shaft 122, on which is fixed a plurality of rearwardly extending arms 123, one for each pin-restoring plate 119 and underlying the latter. Near the end of the rearward return stroke of the general operator 79, the pawl 120 thereon will engage the under side of the arm 121 to rock the shaft 122 and therewith the arms 123 to move upwardly the pin-restoring plate 119 into contact with the lower edge of all the pin-bearing bars 54 to move upwardly said index pins 55, said pins being slidably mounted on said bars, out of the path of the general operator cross-bar 72, so that at the subsequent reciprocation of the cross-bar 72 only those pins which had been depressed in a subsequent computation will be engaged thereby. It will be noted, by reference to Fig. 1, that the pin-restoring plate 119 is mounted on bell cranks connected by links and is actuated in a manner similar to that illustrated in said Hanson patent. It will be noted that at the return to normal position of the general operator, the parts of the mechanism which return to their normal position include the index pins, pin-restoring plate, carry-over mechanism, pin-bearing bars, general operator, driving mechanism and motor-trip mechanism. It will also be noted that an automatic subtraction mechanism, to be presently described, is also returned to its normal position at the same time.

When some of the totalizers are being actuated in the performance of addition, it is advantageous at times to simultaneously actuate others of the totalizers for subtraction or actuate subtractively all of the totalizers in which it is desired to compute at a time, for which purpose, each of the totalizers is provided with manual and with automatic subtraction-setting means.

In the machine herein-disclosed, the complemental method of substraction is employed using "9" as a base, an additional unit being added on the dial wheel of lowest denomination. This method of subtraction is common to many Underwood-Hanson computing machines and is disclosed in the application of Hans Hanson, Serial No. 626,550, filed May 11, 1911 (now Patent No. 1,278,812, of September 10, 1918).

To manually set the machine for subtraction there is provided a key 126 slidably mounted in the front portion of the framework of the machine (Fig. 1), and pivotally mounted at its rear end on an arm 127 fast on a hub 128 (Figs. 6 and 8), which is loosely mounted on the rock shaft 102. When it is desired to set the totalizer of the machine for subtraction, its associated key 126 is pressed rearwardly against the tension of the spring 129 to rock the arm 127 and hub 128 in clockwise direction and therewith the pawl 130 fast on said hub, so that the rear end of the pawl will be moved out of a notch 131 formed in a subtraction bar 132 (Figs. 1, 5 and 6); mounted to be moved horizontally and rearwardly by a normally tensioned spring 133 at a clockwise actuation of said arm and pawl 127, 130. At the rearward stroke of the subtraction bar 132 it is desirable to depress all of the pins 55 corresponding to "9" and associated with the totalizer in which subtraction is to be performed. For this purpose, said subtraction bar 132 is adapted at its rearward stroke to actuate a trigger mechanism, comprising a bell crank 140 pivoted on said subtraction bar and engaging an arm 141 on a bail 142 common to and overlying levers connected to each of the "9" pins. During the rearward stroke of the subtraction bar 132, the arm 141 and bail 142 are swung in counter-clockwise direction, as seen in Fig. 1, so that the universal member of said bail engages all of the levers 143 connected to said "9" pins to depress all of said "9" pins in this nest. At the end of the rearward stroke of said subtraction bar the bell crank 140 will strike against a projection 144 to swing said arm in counter-clockwise direction about its pivot, so as to move one arm thereon out of engagement with the arm 141 of said bail which will then be returned to its normal ineffective position by its spring, not shown herein, so that said "9" pins may be restored to their normal position at the depression of any numeral key except the "0" numeral key, and so that said pins may also be restored to their normal position by the pin-restoring plate 119 at the end of a computation. It will be noted that the here-in described subtraction-setting mechanism is disclosed in the application of Ogden Minton, Serial No. 797,714, filed October 28, 1913.

When subtraction is to be performed on any of the totalizers in accordance with the herein-described complementary method of subtraction, it is advantageous to connect the numeral keys 30 in such a manner as to depress index pins 55 corresponding in value to the complements of the numbers indicated on said numeral keys, using "9" as a base.

For this purpose, the lower reaches 56 of the pin-setting linkage mechanism 57 are connected to the numeral keys when subtraction is to be performed in such a manner that the reach 56 corresponding to the complement of the value of the numeral key actuated will be depressed and therewith the corresponding index pin 55, thus indexing the complement of the number written on the work-sheet in accordance with the herein-mentioned method of subtraction.

As hereinbefore-stated, it is advantageous that some of the totalizers may perform addition while others may perform subtraction. In order that those members of the linkage mechanism 57 in one computing unit, which are to be used to index for subtraction, may be set to depress pins 55 corresponding to the complemental values of the numeral keys actuated, simultaneously with the depression in another computing unit of index pins 55 corresponding directly to said values of said numeral keys for the performance of addition, there is provided on the subtraction bar 132 (Fig. 1), a pin 150 engaged by a bell crank 151, the upper arm of which has a pin-and-slot connection with a swinging shelf 152 pivoted to the framework of the machine and connected to all of the rock shafts 64 of a set, in such a manner that said rock shafts will be moved forwardly at the release of the subtraction bar 132, as disclosed in said application of Richard M. Becker, Serial No. 782,307, filed July 31, 1913.

It will be noted that there is a shelf 152 associated with each subtraction bar 132, and each of said shelves is common to all of those rock shafts 64 which are associated with an individual totalizer. When the rock shafts 64 are moved forwardly at the release of the subtraction bar 132, the depending arms 63 thereon will be moved out of engagement with the linkages 65 corresponding directly to the values of the associated numeral keys and will be moved into engagement with those of the linkages 65, respectively, corresponding to said complemental values of the numeral keys, said arms 63, however, retaining connection, in their forward position, with the linkages 62 and the upright arms 61, so as to maintain their relative connection with the numeral keys 30. Each rock shaft 64 has fast at the rear end thereof an arm 153 which is moved into engagement with a linkage 154 when said rock shafts are moved to subtraction position and are adapted, at the depression of any numeral key from "1" to "9," to actuate the levers 143 pivoted on the rack bars 54 to restore to normal position the "9" pins 55 in the denomination in which any numeral key from "1" to "9" may be actuated.

It will be seen from the foregoing that indexing may be performed simultaneously for any number of totalizers, either for addition or subtraction, when the numbers are written upon the work-sheet.

After the numbers have thus been indexed, either for addition or subtraction, the general operator is reciprocated in the hereinbefore-described manner to rotate simultaneously the dial wheels 69, amounts proportional to the digital value of the depressed pins 55.

When subtraction is being performed in any of the totalizers, it is advantageous with the construction herein shown to rotate the wheel of lowest denomination one additional digit distance in accordance with the herein-mentioned method of subtraction.

For this purpose, there is associated with each totalizer a supplementary bar 157 (Figs. 1 and 5), mounted in a manner similar to, and parallel with, the rack bars 54, and having a lever 158 pivoted thereto, the rear end of which is adapted to be depressed by the bail 142 at the release of the subtraction bar 132, so that a projection 159 is moved into the path of the general operator cross-bar 72. At the forward stroke of the general operator its cross-bar will engage the depressed projection 159 and move forwardly therewith the supplementary bar 157, so that an extension 160 thereon will engage any of the depressed pins 55 on the units bar 54 to move said bar forwardly, said extension 160 being so placed in advance of the cross-bar 72 that said units rack bar 54 will be moved forwardly an additional digit distance when the pins thereon are engaged by said projection 160. During addition, however, said projection 160 waits and moves forward with its front edge on, or par with, the front edge of the cross-bar 72, there being provided a recess 161 formed on the general operator cross-bar 72 into which said projection 160 will slide when the projection 159 of the lever 158 is in its normal ineffective position. It will be noted that the supplementary bar herein-described is similar in construction and action to that shown in the pending application of John N. Thornton, Serial No. 769,132, filed May 22, 1913.

In the machine, as herein-disclosed, it is advantageous to automatically set the various computing members to subtraction as the work-sheet enters a computing zone in which one or more of the totalizers are performing subtraction.

For this purpose, each dog 44 may be provided with a subtraction tappet 155 similar in construction to the denominational selecting tappets 45 (Figs. 1, 2 and 12), and adapted to engage a subtraction bail 166 (Figs. 13 and 14), extending throughout the entire length of travel of the tappet 155 through a computing zone and mounted on a swinging frame 167 having an extension 168 which overlies a link 169 (Figs. 1 and 6), connected at its lower end to an arm 170 of a bell crank lever also pivoted at 97, and having an upright arm 171 which is connected to a slidably-mounted latch 172, the free end of which underlies an arm 173 (Figs. 6, 7 and 8), loosely mounted on the rock shaft 102 and constantly drawn to swing in clockwise direction as seen in Fig. 8 by a spring 174, but normally held against said clockwise rotation by the latch 172 in a manner illustrated and more fully described in said application of John N. Thornton, Serial No. 769,132, filed May 22, 1913.

It will be seen that as the typewriter carriage 36 and tappet 155 connected thereto enters a computing zone in which it is desired to perform subtraction that the tappet 155 will engage the bail 166 in advance of the engagement of the associated tappet 45 with the jack 46 of highest denomination, to rock the rear end 168 of the swinging frame 167 downwardly to depress the link 169 and arm 170, and thereby move the latch 172 rightwardly, as seen in Figs. 6 and 8, from underneath the free end of the arm 173, so that the latter will be swung in clockwise direction, and a projection 175 on said arm will be brought into engagement with a projection 176 fast on the hub 128, to swing the latter and the connected pawl 130 in clockwise direction by the power of the spring 174, which is sufficiently in excess of the power of the spring 129, to overcome the latter and thus move said pawl 130 out of the notch 131 (Fig. 1) of the subtraction bar 132 to release said bar, and thereby set the associated mechanism to subtraction position in the same manner as when said bar 132 is released manually at the depression of the key 126, as hereinbefore-described.

In order to restore the pin-setting linkage mechanism 57 and subtraction bar 132 to normal adding position, so that addition may be subsequently performed on the totalizer, mechanism is provided as will be presently described. To restore said bar 132 to normal position the arm 173 has a cam 177 formed at the forward end thereof which is moved into the path of the general operator cross-bar 72 (Figs. 7 and 8), when said arm is swung to subtraction position. During the initial part of the forward stroke of the general operator in a subtraction computation, its cross-bar 72 will be moved into engagement with the cam 177 to swing the arm 173 in counter-clockwise direction, so that the rear end thereof will be moved out of the path of the leftward movement of the latch 172, as seen in Figs. 6 and 8, so that the latter may be returned to its normal position by its spring 178 (Fig. 1), and thereby release the pawl 130 so that its end may be moved into the notch 131 of the subtraction bar by the spring 129. This occurs when the general operator cross-bar 72 engages a tooth 179 (Fig. 1), formed on the subtraction bar 132, and moves said subtraction bar forwardly against the tension of its spring 133 to its normal ineffective position, so that its notch 131 will be moved into engaging relation with the pawl 130, at which time said pawl will snap up into said notch to hold the subtraction bar 132 in its forward normal position when the general operator recedes.

It will be noted in passing that simultaneously with the return to normal of the arm 173, the arm 100 of the motor-clutch trip mechanism is also returned to normal position by a cam 185 (Fig. 8), formed on the general operator framework 79 and adapted to engage and swing in clockwise direction an extension formed on the arm 104 to rock the shaft 102 therewith and through the intermediary of the pin-and-slot connection 101 rock the arm 100 against the tension of its spring 103, so that the rear end thereof will be moved out of the path of the latch 99, so that said latch may be moved leftwardly by its spring 186, as seen in Figs. 6 and 8, to overlie the rear end of the arm 100 and hold said arm and connected parts in a normal ineffective position.

Heretofore, in machines of the character herein-described, it has been customary to place each dog 44 on the typewriter carriage in such position relative to the denominational selecting jacks and to the work-sheet form to be typewritten upon, so that computation will take place correctly in the various registers corresponding to the requirements of the particular variety of the work performed on said work-sheet. This setting of the dogs is usually done manually and causes much labor and great time consumption when a variety of work-sheet forms are to be used in sequence and with frequency, the operative being compelled at each change of form of work-sheet to remove one or more of the demoninational selecting dogs from their previous position and move them to a position corresponding to the type of computation required in the various columns of the next work-sheet and to the letter-space positions of said columns or computing zones on said work-sheet.

I have found it advantageous to provide a plurality of denominational dogs 44 so placed relatively to the letter-space positions along the typewriter carriage as to correspond to the letter-space positions of the various computing zones on a great number of work-sheet forms when positioned along the writing line of the platen 35, by means of an adjustable paper-gage 200 (Figs. 1, 21, 22 and 23), provided for the purpose.

In order that only those of the tappets 45, 155, corresponding to the work-sheet placed on the machine, may be effective, there is provided mechanism settable to render all of the other denominational selectors ineffective.

For this purpose, there are provided two relatively superposed plates or bars 201, 202 adapted to travel in unison in letter-feeding direction with the typewriter carriage 36, and having common perforations 203 formed therein (Figs. 3 and 21), through which may extend those tappets which it is desired should be in effective position corresponding to the work-sheet on the machine, the others of the tappets 45, 155 being held in ineffective position, as seen in Figs. 6, 21, 22 and 23; each dog 44 may be provided with a number of the tappets 45 to allow for different combinations. Bars 201 and 202 have something of the action of a stencil and, in view of their resemblance to the perforated jacquard cards used in weaving, may properly be called jacquard stencils.

As herein-disclosed, the denominational selection-controlling plates 201 and 202 are formed to correspond to work-sheets illustrated as "Form 1," "Form 2" and "Form 3," shown in Figs. 21, 15 and 16, respectively, but it will be understood that the plates 201 and 202 may have the perforations 203 placed thereon in any desirable position and combined to conform to a very great variety of work-sheets and computations, and to coöperate with any number of totalizers.

As seen in Fig. 21, the machine is set to perform computations corresponding to the requirements of "Form 1," which setting may be maintained so long as the work-sheets 204 constituting "Form 1," or work-sheets similar thereto, are used in the machine. When, however, it is desired to set the machine to perform computations corresponding to the requirements of work-sheets 205, constituting "Form 2" (Fig. 15), the corresponding tappets 45, 155, are moved to effective position and those of the tappets which had previously been in effective position and are not required to perform denominational selecting or subtraction setting, are moved to ineffective position.

For this purpose, the plates 201, 202 are adapted to slide relatively to each other to move to ineffective position all of the tappets on all of the denominational-selecting dogs 44, and are also adapted to move relatively to the typewriter carriage, and be locked thereto in any position in accordance with a scale formed on the plate 201, coöperating with an index 206 fast on the typewriter carriage framework 36. Said scale has marked thereon (Figs. 21, 22, 23) the numerals "1," "2," and "3," which when moved opposite the index 206 will set the denominational-selecting mechanism to correspond to "Form 1," "Form 2," or "Form 3," respectively. It will be noted, by reference to Fig. 21, that said scale numerals "1," "2," and "3" have marked directly above them the numerals "15," "0," and "40," respectively, to indicate the position to which the gage 200 shall be placed, so that the work-sheets may be placed in the machine with their computing zone in juxtaposition with the denominational-selecting dogs. For this purpose, the gage 200 is provided with an index 207, coöperating with a scale 208 formed on the paper table of the typewriter carriage 36, the gage 200 being provided with a handle 209 (Figs. 1 and 21), for the purpose of manually shifting said gage to the position indicated by the index 206. It will also be noted that the scale formed on the plate 201 has the word "Off" placed thereon, which, when moved opposite the index 206, will move the denominational-selector-controlling plates 201, 202, into a position to render all of the tappets 45, 155 ineffective, thus neutralizing all of the totalizers of the machine.

In order that the plate 202 may be moved leftwardly, relatively to the plate 201, to depress the tappets 45, 155 below the level of said plates, so that the latter may be moved relatively to the typewriter carriage 36, the plate 202 is provided with a finger-piece 210 which, when moved toward an adjacent finger-piece 211 fast on the plate 201, against the tension of a spring 212, from the Fig. 21 position to the Fig. 11 position, will move the slide 202 therewith, the latter being guided by slots 213 formed at both ends of said plate and engaging collars 214 fast on the brackets 215, 216. The slots 213 are formed so that the plate 202 will be moved leftward during the initial part of its stroke and will be moved both leftward and forward during the latter part of said stroke, so that the apertures 203 formed in the plate 202 will be moved leftward out of coincidence with corresponding apertures in the plate 201, and will also be moved forward out of coincidence with the latter. During said leftward stroke of the plate 202, the edges of its apertures 203 will engage all of the upstanding tappets 45, 155 to swing the latter about their pivots 217 against the tension of their springs 218 from the Fig. 3 position to the Fig. 4 position, so that the plates 201 and 202 may be moved in unison relatively to the typewriter carriage 36, rightwardly or leftwardly, without causing any interference with the tappets 45, 155, the said plates being unlocked from the typewriter carriage at the time, as will presently be described.

It will be noted by reference to Fig. 11 that as the apertures 203 formed in the plate 202 are moved leftwardly out of register with the apertures in the plate 201 that the former are moved to a position relative to the tappets 45, 155, so that the rear edge of said apertures will be moved forwardly beyond the reach of the tappets, so that when said plates move in unison, the free ends of the tappets will not come into engagement with any of the apertures 203 formed in the plate 202, thus avoiding collision between said tappets and the edges of said apertures.

It will be noted by reference to Figs. 21, 22 and 23 that some of the apertures 203 are double the width from front to rear, so as to permit two of the tappets to protrude therethrough. With such double-width apertures, the leftward and forward movement of plate 202 will carry apertures 203 to the left to depress both of the tappets normally protruding therethrough and also forwardly beyond the reach of the rearward tappet but not beyond that of the forward of the two tappets. In order to prevent collision between the forward one of said tappets and the left edge of said double width aperture during the rightward movement of the plates 201, 202, there is formed on said double width apertures a cam surface 219 which, when moved into engagement with any of the tappets 45, will cam said tappets down against the tension of the springs 218, and thereby permit said plates to be moved further rightward.

It will be noted in passing that the upper plate 201 is fixed to the brackets 215 by means of screws 220, which also serve to hold the guiding collars 214 which coöperate with the slots 213, said collars 214 being of a somewhat greater height than the thickness of the plate 202, so that said plate may be easily slid leftward or rightward relatively to the plate 201 by the finger-piece 210 or spring 212, respectively.

In order that the denominational selector-controlling plates 201, 202, may move in unison with the carriage 36, the brackets 215 are slidably mounted on the bar 48 (Figs. 12, 17, 19 and 20), and have projections 221 formed on their underside at the rear of the rack bar 49 to guide and hold the latch 223. Pivoted at 222 to the left-hand bracket 215 is the latch 223, (Figs. 17 and 20), the lower end of which is normally in engagement with one of the notches formed in the bar 49 and held therein by a compression spring 224, one end of which is fast in a depression 225 formed in the bracket 215, and the free end of which bears against the upper end of the latch 223. During the latter part of the leftward movement of the plate 202, when said plate is simultaneously moved forwardly, said forward movement causes an aperture 226 formed in said plate to be moved into engagement with a cam surface 227 formed at the upper end of the latch 223, to swing said latch in counter-clockwise direction from the Fig. 17 position to the Fig. 20 position, to move the lower end thereof out of engagement and clear of any of the notches formed in the bar 49, so as to unlock said bracket 215 and disconnect the parts from the typewriter carriage, at which time the plates 201, 202 and connected parts may be moved in unison, relatively to the typewriter carriage, so that a mark on the scale formed on the plate 201 may be brought opposite the index 206, for the purpose hereinbefore-mentioned.

When the plates 201, 202 have been thus positioned, manual pressure on the finger-pieces 210, 211 may be released, at which time the plate 202 will be moved rightwardly by the power of the spring 212 until the left ends of the slots 213 will be moved into engagement with their respective collars 214, at which time the aperture 226 will have been returned to normal position, and therewith the latch 223 by the power of its spring 224, so that the lower end thereof will engage a notch in the bar 49, said latch being so placed relatively to the scale formed on the plate 201 as to be directly opposite one of the notches formed on the bar 49 when a mark on said scale is directly opposite the index 206. The lower end of said latch 223 may be cam-shaped as at 228 (Fig. 18), so as to facilitate the positioning of the plates 201, 202, and the locking thereof to the typewriter carriage.

When the plates 201, 202 have thus been positioned and locked to the typewriter carriage, the apertures 203 formed on the respective plates will have been moved into register with each other and thus all the tappets 45, 155, directly underlying those of the superposed apertures 203, will be swung to effective position by their springs 218 into engaging relation with the denominational jacks 46, so that computation may be performed of a type corresponding to the setting of said plates 201, 202.

The effectiveness of the denominational selecting mechanism, and thus of the computing mechanism, is controlled by a roller 245 which normally tends to raise the dogs 44 and the tappets thereon into engaging relation with the jack cams 50. The roller 245 extends clear across the machine and coöperates with conical rollers 246, journaled, one on each dog 44. A key 247 is provided to throw the roller 245 out of coöperative relation with the rollers 246, thereby permitting the dogs to swing downward about the rod 48 to take the tappets 45 out of engaging relation with the tappet cams 50. Connection from the key 247 to the roller 245 is made by a bell crank lever 248 which engages with an arm 249 to rock a shaft 250 in a clockwise direction (Fig. 1). Secured to the shaft are two upright arms 251, one at each side of the machine, which carry the roller 245. A spring 252 tends to hold the roller 245 in its effective position. It should be understood that the dogs are held between the slide bar 202 and a bar 253, the latter being secured to the two brackets 215, 216, and extends under the dogs 44, and that with this construction the dogs and slides move about the rod 48 as a single unit when the dogs are swung to their ineffective position.

It will be seen that by the use of the key 247 and connected mechanism that the totalizers may be neutralized at the will of the operative without changing the adjustment of the tappet-controlling plates 201, 202.

As hereinbefore stated, the tappet controlling plates 201, 202, may have the perforations 203 placed thereon, so as to cause computation to take place at the actuation of a numeral key in any desired computing zone along the writing line and in any totalizer of the machine, and said plates may be arranged to set up said tappets in various ways when said plates are moved relatively to said tappets. As herein disclosed, however, the construction of the tappet-controlling plates 201, 202, is adapted to cooperate with specific forms of work-sheets 204, 205 and 255, corresponding to the herein-mentioned work-sheets, "Form 1," "Form 2" and "Form 3," shown in Figs. 21, 15 and 16, respectively, wherein 204 is a sheet of a loose-leaf sales-book, 205 a sheet of a voucher register and 255 a sheet of a ledger.

It will be seen by reference to Fig. 21 that the jack heads 47 and denominational selecting dogs 44 are placed in close proximity to each other from right to left, and that some of the tappets 45, which protrude through the perforations in the plates 201 and 202, pass beneath some of the jacks associated with a totalizer in which it is desired to compute simultaneously with the passing of some of the tappets 45 beneath a set of jacks associated with a totalizer in which it is desired not to compute. In order that only those of the totalizers in which it is desired to compute may be actuated at a time, and in order to avoid the construction of a machine of too great a width from left to right, each dog is provided with five tappets 45 extending from front to rear (Figs. 1, 2 and 21). Each tappet travels in a vertical plane extending from right to left of the machine, to cooperate with differently positioned cams 50 on the jacks 46 for the different computing units. The tappets in the rearmost plane engage the jack cams 50, 94, and cooperate with totalizer No. 1; the tappets in the next rearmost plane cooperate with the cams 50 of totalizer No. 2, and so on to the foremost plane, the tappets in which will cooperate with totalizer No. 5. It will be seen by reference to Figs. 21, 22 and 23 that the jack cams associated with the totalizers No. 6 and No. 7, cooperate with the tappets in the rearmost plane and the plane adjacent thereto, respectively, but this does not vitiate the action of the machine, since the dogs located at the right end of the typewriter carriage never enter the denominational selecting zones of totalizers No. 1 and No. 2, since the carriage of the usual typewriter does not travel a distance so that the extreme right end of its carriage will move over the extreme left end of the typewriter framework, which it would have to do in order to move the tappets 45, which normally cooperate with totalizers No. 6 and No. 7, into the denominational selecting zones of the totalizers No. 1 and No. 2.

It will be noted, by reference to Figs. 2 and 21, that each dog 44 is provided with a subtraction tappet 155, placed forwardly of the foremost denomination selecting tappet 45, and is adapted, as hereinbefore described, to actuate the bail 166 with which the subtraction-setting mechanism cooperates when a subtraction zone on the work-sheet is moved to the printing point, as will presently be described, there being apertures formed in the plates 201, 202, which, when moved over said tappet 155, will allow said tappet to be moved into effective position by its spring.

With the above arrangement of tappets and jacks, any type of computation may be performed in any number of registers in the capacity of the machine, when numbers are printed in any of the computing zones of a work-sheet, depending upon the arrangement of the perforations 203, formed in the plates 201, 202, relative to the tappets. As shown in Figs. 21, 22 and 23, the perforations 203 are arranged to correspond to work-sheets 204, 205 and 255.

When work-sheet 204 "Form 1" is placed in the machine (Figs. 21 and 24), and the computing column headed "Amount" under "Debit" 55 is brought to the printing point, said "Form 1" being a sheet of a sales-book, it is advantageous, when printing in said column under said heading, to perform addition in registers No. 1 and No. 7, for a purpose presently to appear. To do this, the plates 201 and 202 are moved until the numeral "1" thereon appears opposite the index 206, so that the tappet 260 on the extreme left-hand dog 44 will protrude through an aperture 261 and will cooperate with the cams 50 of register No. 1, thus indexing additively upon the computing mechanism associated with said register No. 1 any number printed in column 1, which in the present example is an item of 1,200.00 dollars, indicating the amount of the item in line with said number under the heading "Description." Simultaneously with the writing of said 1,200.00 dollars and indexing thereof on register No. 1, a tappet 262, protruding through an aperture 263, will actuate the jacks 46 associated with register No. 7, to index therein said 1,200.00 dollars, so that at the forward stroke of the general operator, there will appear on the dial wheels of the totalizers No. 1 and No. 7, the number 1,200.00.

In writing the next number, which is 1,200.00 dollars in column 3 headed "A machine sales," it is advantageous to index said number additively in registers No. 2 and No. 5. For this purpose, there are provided tappets 264, 265, extending through apertures 266, 267, adapted to engage the denominational jacks associated with the registers No. 2 and No. 5, respectively, when said column 3 is brought to the writing point, so that after said 1,200.00 dollars is written in said column and the general operator is reciprocated, there will appear on each of the totalizers, No. 2 and No. 5, the number 1,200.00.

The next number written on the worksheet is 1,000.00 dollars, in line with the item "B machine" in column 1, directly beneath the previous number written in said column, and is likewise added in registers 1 and 7, so that on the dial wheels of each of the totalizers thereof will appear the number 2,200.00 dollars.

Written in line with the last amount is the same amount, namely, 1,000.00 dollars, in column 4, which is headed "B machines," and it will be advantageous to add said amount in registers No. 2 and No. 4. For this purpose, there are provided tappets 268, 269, extending through apertures 270, 271, respectively, said tappets being adapted, when the fourth column is brought to the writing point, to engage the jacks associated with registers No. 2 and No. 4, respectively, so as to exhibit on the respective totalizers the amount of 1,000.00 dollars at the reciprocation of the general operator after said number had been written in said column and indexed on said registers.

The next amount 25.00 dollars, is written in column 1 in line with the item "Set tools" and is added in registers No. 1 and No. 7 in a manner as previously described, by the coöperation of the tappets 260, 262, with the jacks of the associated registers, so that the dial wheels of said registers will exhibit the number 2,225.00 dollars at the end of said computation in column 1. The amounts thus far having been copied onto "Form 1" from purchasers' orders, salesman's reports or the like.

The next amount is preferably written in column 2, headed "Accounts receivable," and may be written in line with the last amount in column 1, namely, 25.00 dollars. The amount in said column 2 is written to agree with the number exhibited on totalizer No. 1, namely, 2225.00 dollars, and is advantageously subtractively indexed on the mechanism associated with register No. 1. For this purpose, there is provided a tappet 272 extending through an aperture 273 and adapted to engage the jacks associated with register No. 1 when said column 2 is brought to the writing point. Before the tappet 272 engages any of the jacks 46, its associated subtraction-setting tappet 155, extending through an aperture 274, will actuate the subtraction bail 166 associated with said register to set the indexing mechanism thereof, so as to index any number written in said column 2 in accordance with the herein-described method of subtraction. It will be seen that after the reciprocation of the general operator and following the writing of said amount in column 2, that the dial wheels of register 1 will be actuated subtractively and will be returned to zero, provided that reading thereon had been copied correctly when writing in column 2. In case register No. 1 does not exhibit zero after said amount has been written in column 2, the operative is warned thereby that an error has been made in the computation or in copying, and is thereby enabled to correct said error before proceeding with following computations.

Written in line with the last two amounts in columns 1 and 2 (Fig. 21) is the number 25.00 dollars in column 5 under heading "Amount" under "Sundry sales." It is advantageous when writing in said column 5 to additively index said amount in registers No. 2 and No. 3, for which purpose there is provided on one of the dogs 44 a tappet 275 (Fig. 21), extending through an aperture 276, and a tappet 277 extending through an aperture 271, and which are so placed relatively to the typewriter carriage and column 5 that when said column is brought to the writing point, the tappets 275 and 277 will engage respectively the cams 50 formed on the jacks associated with registers No. 2 and No. 3 so as to run said amount into the respective totalizers, and thereby cause the reading on totalizer No. 2 to be 2225.00 dollars and the reading on totalizer No. 3 to be 25.00 dollars.

The writing of this last amount completes the work on said "Form 1," or sales-book sheet 204, as illustrated in the present example, but other or additional amounts may be written on said "Form 1" to exhibit on the totalizers a reading corresponding to the entries thereon.

It will be seen from the foregoing and by reference to Figs. 21 and 24 that totalizer No. 1 will exhibit the total of each invoice after all the amounts are entered in column 1 and is returned to read "0" after said total exhibited thereon has been written in column 2, so that totalizer No. 1 will be ready to exhibit the total of all amounts written in column 1 of the next invoice, either on the same sheet or another worksheet 204. It will also be seen that totalizer No. 2 at the completion of the writing of each invoice will exhibit all the invoice entries as distributed, whereby the operative can determine the correctness of his entries in columns 3, 4 and 5, (Fig. 21) by comparing the reading of totalizer 2 with that of totalizer 7 which agree in this example (Form 1). It will also be seen that totalizer 3 will exhibit the total of all "Sundry sales;" that totalizer 4 will exhibit the total of all "B machines sales;" and that totalizer 7 will exhibit the total of all invoices (column 1) entered on all the work-sheets 204, as distinguished from invoices distributed over the various columns of said work-sheets (columns 3, 4 and 5), as exhibited on totalizer 2. The reading of totalizers 2 and 7 should always agree to prove that the entries on work-sheets 204 have been correctly made.

It will be noted in passing that any register may be caused to either add or subtract, or add and subtract, when the machine is set to compute when writing on any one of the various work-sheets, and for purposes corresponding to the results required when computing on said work-sheets, and to coöperate with the other registers of the machine in a manner corresponding to the various forms of computation required when writing on said work-sheets.

When it is desired to compute in connection with work-sheet 205 "Form 2" (Figs. 15 and 22), the operative, after moving the slides 201, 202 relatively to each other by the handles 210, 211, moves said slides in unison until the numeral "2" on the scale thereon is opposite the index 206. At the release of the finger-piece 210 the respective apertures 203 formed in said slides are moved into register with each other, so that such tappets 45 will project therethrough which correspond to the arrangement required for computing in the proper totalizers when writing amounts on "Form 2."

It will be seen by reference to Fig. 22 that concomitantly with the indicating of the numeral "2" formed on the plate scales, numeral "0" is also indicated by the index 206. The paper gage 200 is then moved so that its index 207 will indicate the corresponding numeral "0" on its associated scale.

It will be seen by reference to Figs. 15, 22 and 24 that when column 1 headed "Accounts payable" is brought to the writing point and the amount 125.00 dollars is written on the first line in said column, said amount will be added in register 7, so that the totalizer thereof will exhibit the number 125.00 dollars, there being provided for the purpose the tappet 262 projecting through an aperture 278 placed adjacent to the right of and in the same vertical plane as the aperture 263, so that said tappet 262 may index numbers in register 7 when writing in column 1 on "Form 2" in the same manner as when writing numbers in column 1 on "Form 1," but for the purpose of exhibiting the total of all vouchers as issued instead of invoice totals.

The next item entered on the "Voucher register" is 55.00 dollars in column 2 headed "H factory." It is advantageous when writing in said column 2 to perform addition in registers 1 and 6 for purposes presently to appear. To index said amount additively in said registers 1 and 6, there is provided (Fig. 22) the tappet 272 extending through an aperture 279 and a tappet 280 extending through an aperture 281 which, when column 2 on "Form 2" is brought to the writing point, will respectively engage the jack cams 50, 94 associated with each of the registers 1 and 6, so as to cause the amount 55.00 dollars to appear on the respective totalizers of said registers.

The next amount 70.00 dollars is entered in column 3 headed "B factory" and in line with the last amount, namely, 55.00 dollars, and is advantageously added in registers 1 and 5. For this purpose, there is provided a tappet 282 projecting through an aperture 283 and the tappet 265 projecting through an aperture 284, so placed on the typewriter carriage that when column 3 is brought to the writing point and the number 70.00 dollars written therein, said amount will be additively indexed in the registers 1 and 5, so as to cause the totalizers thereof, at the actuation of the general operator, to exhibit the amounts 125.00 dollars and 70.00 dollars, respectively.

The next amount, 50.00 dollars, is written in column 1 directly below the previously-written amount, namely, 125.00 dollars, and is added in totalizer 7 in the same manner as said previous amount in column 1, to cause said totalizer to exhibit the amount, 175.00 dollars.

In line with said last amount and in column 4 headed "Sundry Mdse." is again written said amount, 50.00 dollars, but when written in said column 4 is added in registers 1 and 4, there being provided for the purpose a tappet 285 extending through an aperture 286 and the tappet 269 extending through an aperture 287, said tappets being so placed as to actuate the jacks associated with registers 1 and 4 when the amount, 50.00 dollars, is being written in said column. After the writing and indexing of said 50.00 dollars in column 4, the general operator is actuated to exhibit 175.00 dollars and 50.00 dollars on the totalizers 1 and 4, respectively.

The next amount, 30.00 dollars, is written in column 1 and indexed in register 7 through the intermediary of the tappet 262, in the same manner as the other amounts written in said column, after which, at the actuation of the general operator, the totalizer will exhibit the amount 205.00 dollars. The same amount, namely, 30.00 dollars, is written in column 6, headed "Amount" under "Sundries." When writing in column 6, it is advantageous to add the amount in registers 1 and 3, for which purpose, there is provided on the dogs 44 a tappet 288 extending through an aperture 289, said tappet being located in the rearmost tappet plane and adapted to engage the denominational jacks 46 when said column 6 is brought to the writing point to index upon register 1 the amount written in said column 6. Simultaneously with said indexing on register 1, a tappet 290 extending through an aperture 291 is brought into engagement with the jacks 46 of register 3, so that said amount may also be indexed on the mechanism of said register. At the actuation of the general operator said amount 30.00 dollars is run into the totalizers of the registers 1 and 3, so as to exhibit the amount 205.00 dollars on totalizer 1 and 30.00 dollars on totalizer 3.

The next amount, 130.00 dollars, is written in column 1 (Fig. 15), and run into register 7, in the hereinbefore-described manner, so that the totalizer thereon will exhibit the amount 235.00 dollars.

The amount 130.00 dollars is again written in column 5 and is advantageously added in registers 1 and 2, for which purpose there is provided a tappet 292 extending through an aperture 293 and a tappet 294 extending through the aperture 289 to engage respectively the denominational jacks 46 associated with registers 1 and 2 to index thereon the number written in column 5 which, at the actuation of the general operator, is run into the respective totalizers to exhibit the amount 235.00 dollars on totalizer 1 and 130.00 dollars on totalizer 2.

It will be seen from the foregoing that totalizer 7 will exhibit the total of all vouchers issued and entered under the heading "Accounts payable;" totalizer 6 will exhibit the total of all vouchers chargeable to "H factory;" totalizer 5 will exhibit all vouchers chargeable to "B factory;" totalizer 4 will exhibit the total of all vouchers charged to "Sundry mdse.;" totalizer 2 will exhibit the total of all vouchers chargeable to "Expenses." Totalizer 3 will exhibit the total of all vouchers chargeable to "Sundries."

It will also be seen that totalizer 1 will exhibit the total of all vouchers as distributed over work-sheet 205, "Form 2," as distinguished from the total of all vouchers issued as exhibited on totalizer 7. The amounts exhibited on totalizers 1 and 7 will agree, and the reading of totalizer 1 will also serve as a check on correctness of all entries made in columns 2 to 6.

Other amounts than those shown on "Form 2" may be entered thereon and computed, and to any amount within the capacity of the machine in the same manner as in the present example, and the controlling plates 201, 202 may be so formed that the totals will be accumulated in totalizers other than those mentioned in the present example.

When it is desired to compute in connection with work-sheet 255 "Form 3" (Figs. 16, 23 and 24), the operative adjusts the slides 201, 202, in the hereinbefore-described manner, so that the scale numerals "3" and "40" thereon coincide with the index 206 and then moves the paper gage 200 to a corresponding position along the paper table of the typewriter carriage 36, as seen in Fig. 23.

After the work-sheet is placed on the machine, the first amount is written in column 3 (Fig. 16), headed "Prior balance," which in the present example is 50.00 dollars, which it is advantageous to index additively on register 1, for which purpose there is connected with the typewriter carriage 36 a tappet 296 extending through an aperture 297 and adapted to actuate the denominational jacks 46 associated with register 1 when said column 3 is brought to the writing point, so as to index any amount written in said column on the index bars of said register, so that at the reciprocation of the general operator, the totalizer associated with said register will exhibit the amount 50.00 dollars.

The amount (in this example 50.00 dollars) exhibited on totalizer 1 at the end of each transaction is written in column 4 under the heading "Balance" and is advantageously subtractively indexed in register 1, for a purpose presently to be described. In order to thus index said amount, there is connected with the carriage the denominational selecting tappet 288 extending through an aperture 299 and a subtraction tappet 300 extending through an aperture 301, adapted to engage respectively the denominational jacks 46 and subtraction bail 166 to set the mechanism of register 1 to subtraction in the hereinbefore-described manner and to index thereon the amount 50.00 dollars when column 4 is at the writing point and said amount written therein, which at the reciprocation of the general operator will be subtracted on totalizer 1 to exhibit the reading of zero thereon.

The next amount 2,225.00 dollars is entered in column 1, headed "Debits," and is additively indexed on registers 1 and 2. For this purpose, there is provided on the typewriter carriage the denominational selecting tappet 285 extending through an aperture 302 and the denominational selecting tappet 268 extending through the aperture 297 to engage respectively the jacks 46, 93 associated with registers 1 and 2 to compute additively therein the amount 2,225.00 dollars, so that the totalizers 1 and 2 will each exhibit said amount.

The next amount 1,000.00 is entered in column 2 under the heading "Credits." It is advantageously subtractively indexed in register 1 and additively indexed in register 4, for which purpose, there is connected to the typewriter carriage the denominational selecting tappet 292 extending through an aperture 303, and associated therewith is a subtraction tappet 304 extending through an aperture 305, so as to engage the jacks 46, 93 and the subtraction bail 166 when said column 2 is brought to the writing point to index upon the mechanism of register 1 subtractively, in the hereinbefore-described manner, all amounts written in said column 2 and to actuate the totalizer 1 subtractively to exhibit the amount 1,225.00 dollars. Simultaneously with said indexing on register 1, said amount is indexed on register 4, so that totalizer 4 will exhibit the amount 1,000.00 dollars at the actuation of the general operator. Totalizer 1 now exhibits a balance of 1,225.00 dollars which is written in column 4, and subtractively indexed on register 1 in the same manner as the amount 50.00 dollars previously written in the same column, so that at the actuation of the general operator the dial wheels of totalizer 1 will exhibit the reading of zero which the operative advantageously observes to check the correctness of entries on sheet 255 and to insure correct reading on register 1 during following computations.

Before the next transaction is recorded the amount last written in column 4 is written in column 3 and additively indexed on register 1 in the hereinbefore-described manner, so that totalizer 1 thereof will exhibit the amount 1,225.00 dollars, after which a credit of 1,200.00 dollars is entered in column 2 and subtractively indexed on register 1 and additively indexed on register 4 in the hereinbefore-described manner, so that at the reciprocation of the general operator, totalizer 1 will exhibit the amount 25.00 dollars and totalizer 4 will exhibit the amount 2,200.00 dollars. The reading of totalizer 1 is then written in column 4 and subtractively indexed on register 1 to return the totalizer thereof to zero at the reciprocation of the general operator.

It will be seen from the foregoing that totalizer 1 will exhibit the balance computed for each account posted in the ledger and will return to a reading of zero after each balance has been posted provided amounts are correctly written in the "Balance" column. Totalizer 2 will exhibit the total of debits posted to all accounts, and totalizer 4 will exhibit the total of credits posted to all accounts.

In this example or work done on the herein-disclosed machine, as well as in all other examples herein illustrated and described, amounts other than those shown may be entered in the various columns and correct results exhibited on the totalizers.

It will be seen by reference to Figs. 1, 21, 22 and 23, that the subtraction tappets 155 and coöperating subtraction bails 166 all lie in the same vertical plane, and that those of the tappets 155 which may project through the aperture 203 of the plates 201, 202, at the time the typewriter carriage is moved in letter-feeding direction, will engage and actuate any subtraction bail 166 associated with any register of the machine under which said tappet may pass and set the associated mechanism to subtraction whether or not computation is to take place on the register so set. The said subtraction setting on the mechanism of the registers, in which computing does not take place, will not affect the correctness of the reading of the totalizers in a present or subsequent computation, since said subtraction mechanism is returned to normal ineffective position at every reciprocation of the general operator.

Variations may be resorted to within the scope of the invention, and portions of the improvements may be used without others.

Having thus described my invention, I claim:

1. In a computing machine, the combination with a plurality of computing units, of means for determining which of said computing units shall be effective, comprising a set of actuating members, each movable to effective and ineffective positions, means urging all of said actuating members to corresponding positions, and means for determining which of said actuating members shall be in effective position, comprising a perforated pattern member, certain of said actuating members projecting through perforations in said pattern member, and the others engaging imperforate portions of said pattern member.

2. In a computing machine, in combination, a plurality of totalizers, mechanism whereby a number may be computed either additively or subtractively in each of said totalizers, and a perforated pattern member interposed between certain elements of said mechanism, the perforations in said pattern member and the position of the latter determining the effectiveness of elements on one side of said member on elements on the other side thereof, thereby determining the totalizers in which computation will be effected and the character of the computation for each of them.

3. In a computing machine, the combination with a plurality of computing units, each being settable for addition or subtraction, of a single set of keys, means whereby said computing units may be controlled by said keys, and means to determine which of said units shall be controlled by said set of keys, and which of the units under the control of said keys shall be set for addition or subtraction, including a plurality of actuating members settable to normal and abnormal positions, and a pattern member effective in certain positions to hold certain of said actuating members in abnormal position and ineffective on the remaining actuating members, in accordance with the shape of said pattern member.

4. In a computing machine, the combination with number-indexing means, of a plurality of registers, each register comprising wheels, actuating means effective to rotate said wheels in one direction only, mechanism for registering positive and negative values of an indexed number in different registers simultaneously, and means for determining whether the affected register mechanism shall record positive or negative values in said registers.

5. In a computing machine, the combination with means, including keys for setting up a number, of a plurality of registers, mechanism for registering positive and negative values of said number in different registers simultaneously, a member adjustable to different positions, and means whereby said member in each of its adjusted positions determines the registers to be actuated and the positive or negative character of the computations to be effected in the actuated registers.

6. In a computing machine, the combination with a plurality of registers, of indexing means including sets of denominational members arranged in different ranges, selectors, each having a plurality of settable tappets, to engage with said denominational members, and means to effect a relative traveling movement between said sets of denominational members and said selectors, a subtraction-setting device associated with the indexing means for each register, a settable subtraction tappet on each of said selectors for controlling said subtraction-setting device, and a manually controlled member settable to different positions to engage certain of said tappets in each of its positions, and thereby determine the registers in which computation is to be effected, and whether said computation is to be additive or subtractive.

7. In a computing machine, the combination with a plurality of registers, of means for determining the denominations in which digits are to be indexed, including a set of denominational members for each register, a traveling carriage, a plurality of selector members adjustably positioned along said carriage, a plurality of yieldably supported tappets on each of said selectors, arranged at intervals from front to rear, in alinement with the ends of the denominational members of different sets, to enable actuation *seriatim* of the denominational members in the different sets by operatively positioned tappets, and means to determine the sets of denominational members to be actuated during the passage of a selector member thereby, including a pattern member adjustable to different positions, in certain of which it engages certain of said tappets and holds them in ineffective positions and in other positions maintains all of said tappets in ineffective positions.

8. In a computing machine, the combination with computing mechanism, of a plurality of denomination selectors, an element for selectively rendering said denomination selectors effective, and means, including a key, for moving all of said denomination selectors and said element as a single unit to another position where the denomination selectors are rendered ineffective.

9. In a computing machine, the combination with computing mechanism, of a plurality of denomination selectors, an element for selectively rendering said denomination selectors effective, a roller engaging with said denomination selectors to hold them in a position where they can be rendered effective by said element, and means, including a key, for moving said roller to render said denomination selectors ineffective.

10. In a computing machine, the combination with a plurality of registers, of key-actuated indexing means including a plurality of denomination selectors, a plurality of settable tappets on each of said selectors, and means for determining the selectors to be effective and the registers with respect to which the selectors, so determined, are to be effective, including a perforated bar settable to different positions to coöperate with said tappets to effect a setting of the same and thereby determine the selectors to be effective, and the registers with respect to which said selectors are to be effective.

11. In a computing machine, the combination with keys for setting up a number, of a plurality of totalizers, means for registering said number in different totalizers simultaneously, a series of denomination selectors, each selector provided with a tappet, coöperative denomination selecting mechanism with which said tappets engage, a perforated bar for moving said tappets to an ineffective position, and a second slide bar for rendering a different set of tappets effective.

12. In a computing machine, the combination with computing mechanism, of a plurality of denomination selectors, and means comprising two adjustably positioned perforated bars for selectively rendering said denomination selectors effective at will, according to the position of said bars.

13. In a computing machine, the combination with computing mechanism, of a plurality of denomination selectors, each selector comprising a plurality of tappets, and means comprising two adjustably positioned perforated bars for rendering different sets of tappets effective at will, according to the position of said bars.

14. In a computing machine, the combination with computing mechanism, of denomination selectors, an adjustable element for rendering certain sets of said denomination selectors effective, a paper gage, a scale comprising graduations to which said adjustable element is settable, and numerals at said graduations indicating to what position of another scale said paper gage should be set.

15. In a computing machine, the combination with computing mechanism comprising a plurality of sets of jacks, of a denomination selector comprising a plurality of tappets, and means for selectively rendering any one of said tappets effective to engage with its corresponding set of jacks.

16. In a computing machine, the combination with a plurality of computing units, of controlling means therefor, including a plurality of tappets yieldably urged to operative positions to engage coöperating portions of said computing units during a relative traveling movement of said computing units and said tappets past each other, and a perforated pattern member movable to different positions to enable certain of said tappets to project therethrough in certain adjusted positions of said perforated member and maintaining the remaining tappets in depressed positions.

17. In a computing machine, the combination with a plurality of computing units, of controlling means therefor, including a plurality of tappets yieldably urged to operative positions to engage coöperating portions of said computing units during a relative traveling movement of said computing units and said tappets past each other, and a perforated pattern member movable to different positions to enable certain of said tappets to project therethrough in certain adjusted positions of said perforated member and maintaining the remaining tappets in depressed positions, and means to withdraw the projecting tappets from the corresponding perforations to enable movement of said perforated member to another position, to enable another setting of said tappets.

18. In a computing machine, the combination with computing mechanism comprising a plurality of sets of jacks, of a denomination selector, and means for selectively rendering said denomination selector effective to engage with any set of jacks.

19. In a computing machine, the combination with computing mechanism normally set for addition, of mechanism for setting said computing mechanism to subtraction, a denomination selector, a plurality of sets of jacks, and means for selectively rendering said denomination selector effective to engage with any set of jacks and with the subtraction-setting mechanism.

20. In a computing machine, the combination with computing mechanism comprising a plurality of sets of jacks, of a denomination selector comprising a tappet for each set of jacks, and a tappet for setting the computing mechanism to subtraction, and means for selectively rendering any one of said jack-engaging tappets and the subtraction tappet effective.

21. In a computing machine, a plurality of sets of jacks, arranged in different ranges, denomination selectors, a series of settable tappets on each selector arranged to engage the respective sets of jacks, an adjustable element for setting up different combinations of said tappets, and a latch for securing said adjustable element in any one of a plurality of positions.

22. In a computing machine, the combination with computing mechanism, of a plurality of denomination selectors, adjustable means comprising two perforated bars for selectively rendering said denomination selectors effective at will, and a latch for holding said adjustable means in any one of a plurality of positions, one of said bars being effective to release said latch and render all of the denomination selectors ineffective when it is desired to change the setting of said selectors.

23. In a computing machine, the combination with computing mechanism, of a plurality of denomination selectors, tappets on the denomination selectors, adjustable means comprising two perforated bars for selectively rendering said tappets effective at will, a latch for holding said adjustable means in any one of a plurality of positions; one of said bars being effective to first move all of the tappets out of the perforations in the other bar, to permit a different setting of the tappets, second to release the latch so that the two bars can be shifted to change the setting of said tappets, and a scale on one of said bars, according to which said adjustable means is settable.

24. In a computing machine, the combination with computing mechanism normally set for addition, of means to set said computing mechanism for subtraction, a denomination selector, a settable tappet on said selector for actuating said setting means for automatically shifting the computing mechanism to subtraction, and an adjustable element for causing said tappet to assume an ineffective position on said selector.

25. In a computing mechanism normally set for addition, and comprising a jack head, a series of jacks in said jack head, a subtraction lever in said jack head, and a denomination selector, said denomination selector being effective to engage with said jacks, and with the subtraction lever to automatically shift the computing mechanism from addition to subtraction and retain the computing mechanism set for subtraction until said denomination selector passes out of a computing zone.

26. In a computing machine, the combination with keys and mechanism for setting up a number, of a register, a motor, and a denomination selector for said number-setting mechanism, said denomination selector comprising means for automatically releasing the motor immediately after the digit of lowest denomination has been set up, and means operated by said motor for transmitting the set-up number to said register.

27. In a computing machine, the combination with keys and mechanism for setting up a number, of a register, means normally set for addition for registering the positive or negative value of the set-up number in the said register, a motor, and a denomination selector for said register mechanism, said denomination selector comprising means for automatically setting said register mechanism to subtraction and for automatically rendering the motor effective immediately after the digit of lowest denomination has been set up, said motor being effective to actuate said register mechanism.

28. In a computing mechanism, normally set for addition, and comprising a jack head, jacks in said jack head, a subtraction lever in said jack head, a motor, a motor trip lever in said jack head, and a denomination selector, said denomination selector when it enters a computing zone being effective first to engage with the subtraction lever to set the computing mechanism for subtraction, second to engage with the jacks in said jack head, and third to engage with the motor trip lever immediately after the jack of lowest denomination has been actuated, thus rendering the motor effective to actuate the computing mechanism.

29. In a computing machine, the combination with number-printing devices, pin-setting means, and a plurality of registers, of means for automatically shifting said pin-setting means from addition to subtraction, pin bars, means for effecting an initial forward movement of said pin bars to bring them into effective relation with said pin-setting means, and means for registering positive and negative values of a number in different registers simultaneously.

30. In a computing machine, the combination with number-printing devices, a plurality of registers, a set of pin bars engaging with each register, a series of pins on each bar, a set of pin-setting devices, normally set for addition, one set for each set of pin bars, means intermediate said printing devices and said pin-setting devices for actuating the latter, of means for effecting an initial forward movement of said pin bars to bring the pins into effective relation with said pin-setting devices, means for automatically shifting the pin-setting devices for subtraction, and means for driving the pin bars to register positive or negative values of a number in different registers simultaneously.

31. The combination with computing mechanism, of subtraction-setting mechanism, for said computing mechanism, means, including a subtraction tappet and a member to be engaged and actuated thereby, for operating said subtraction-setting mechanism, and an interponent movable between said tappet and said member to prevent the operation of the latter by the former.

32. The combination with a plurality of computing units, of a plurality of selecting points coöperating with said computing units to obtain different zonal actions, and a jacquard stencil blanking certain of said points and permitting the active protrusion of certain others of said points, to obtain a predetermined cycle of zonal computing actions of said computing units.

33. The combination with a plurality of computing units, of a plurality of selecting points coöperating with said computing units to obtain different zonal actions, and a jacquard stencil blanking certain of said points and permitting the active protrusion of certain others of said points, to obtain a predetermined cycle of zonal computing actions of said computing units, said jacquard stencil being internally changeable to vary the predetermined plan or sequence of computing actions of said computing units.

34. In a combined typewriting and computing machine, the combination with a computing mechanism having variable zonal activities, of a typewriting mechanism including a work-sheet carriage, and an interindexed computing-zone-controlling mechanism and paper-gage, determining the position of the work-sheet on the carriage for a selected series of zonal activities of the machine.

35. The combination with a plurality of computing units, of a plurality of selectors for controlling the operation of said computing units, jacquard means shiftable to adjust the relative condition of said selectors to each other, so as to change a predetermined sequence of actions of said computing units, and means for disengaging said jacquard means from said selectors incident to shifting.

36. The combination with a plurality of computing units, of a plurality of selectors for controlling the operation of said computing units, jacquard means shiftable to adjust the relative condition of said selectors to each other, so as to change a predetermined sequence of actions of said computing units, means for disengaging said jacquard means from said selectors, incident to shifting, a carriage lockingly engaged by said jacquard means, and means releasing said jacquard means from said carriage at its disengaging action with respect to said selectors.

37. The combination with a plurality of computing units, of a traveling carriage, a series of denominational selectors located at intervals along said carriage, and uniting means for joining said selectors to move as a unit relative to said carriage and relative to said computing units, so as to determine potential active and inactive positions of said selectors as a group.

38. In a computing machine, the combination with computing mechanism, of denomination selectors, an adjustable element for rendering certain sets of said denomination selectors effective, a paper-gage, a scale to which said adjustable element is settable, and characters at said scale indicating to what position said paper-gage should be set.

39. In a computing machine, the combination of a controlling device having a plurality of settable tappets, a perforated tappet-selecting plate, guiding means for said tappet-selecting plate, a latching device for holding said tappet-selecting plate in a plurality of different positions, and means for withdrawing the tappets from the perforations of said tappet-selecting plate and for rendering the latching device ineffective to permit movement of said tappet-selecting plate to another position.

40. The combination with computing mechanism, of denomination-selectors, tappets on each of said denomination-selectors, and tappet-selecting means comprising two superposed plates having registering perforations, latching means for holding the upper of said superposed plates in a plurality of different positions, and guiding means for the lower of said plates whereby longitudinal movement thereof will effect first a withdrawal of the tappets from the upper plate and then by a forward movement carry the perforations to the side of the tappets and also render the latching means ineffective.

41. In a computing machine, in combination, a plurality of totalizers, a preliminary representation device for each of said totalizers in which numbers may be indexed additively or subtractively, a subtraction-setting device for each of said preliminary representation devices, a motor device whereby the numbers indexed in said preliminary representation devices may be run into the respective totalizers, and a perforated pattern member, the arrangement of the perforations in said pattern member determining the nature of the indexing in each of the preliminary representation devices and controlling the actuation of the motor device.

42. In a computing machine, in combination, a plurality of totalizers, devices individual to said totalizers whereby the same may be actuated either additively or subtractively, a device universal to said totalizer-actuating devices for actuating the same, a perforated pattern member, and means whereby the perforations in said pattern member will determine the condition of each of said totalizer-actuating devices and also the actuation of said universal device.

43. In a computing machine, in combination, a plurality of totalizers, devices individual to said totalizers whereby the same may be actuated either additively or subtractively, a device universal to said totalizer-actuating devices for actuating the same, a perforated pattern member, means whereby the perforations in said pattern member will determine the condition of each of said totalizer-actuating devices and also the actuation of said universal device, and means whereby said perforated pattern member may be located in different effective positions to vary the effect thereof on the means controlled thereby.

44. The combination with mechanism for computing simultaneously in a plurality of zones, of a plurality of selectors movable to and from effective positions to engage and coöperate with said mechanism, and means to control the position of said selectors, including a member of irregular configuration adapted, when in a certain position, to engage certain of said selectors and to be disengaged from others, thus separating said selectors into an effective group and an ineffective group.

45. In a combined typewriting and computing machine, the combination with a plurality of computing units having sets of denominational jacks in different ranges, of a plurality of selectors, each of said selectors having a plurality of tappets thereon, one for each of said ranges, and means for determining the tappets to be effective, including a pattern member so shaped that, when moved into effective position, it will engage certain tappets, in accordance with the design of said pattern member, and thereby determine a group of effectively-positioned tappets and a group of ineffectively-positioned tappets.

FREDERICK A. HART.

Witnesses:
CATHERINE A. NEWELL,
EDITH B. LIBBEY.